US 6,583,231 B2

(12) United States Patent
Ihrig et al.

(10) Patent No.: US 6,583,231 B2
(45) Date of Patent: Jun. 24, 2003

(54) PROCESS TO MAKE AMINATED POLYOLEFINS

(75) Inventors: Klaus Ihrig, Waldbrunn (DE); Manfred Josef Bergfeld, Erlenbach-Mechenhard (DE); Ulrich Wecker, Frankfurt (DE)

(73) Assignee: Akzo Nobel N.V., Arnhem (NL)

( * ) Notice: Subject to any disclaimer, the term of this patent is extended or adjusted under 35 U.S.C. 154(b) by 50 days.

(21) Appl. No.: 09/767,543

(22) Filed: Jan. 23, 2001

(65) Prior Publication Data

US 2001/0027239 A1 Oct. 4, 2001

(30) Foreign Application Priority Data

Jan. 25, 2000 (EP) .............................. 00200252

(51) Int. Cl.$^7$ ............................... C08F 8/30; C08F 8/06
(52) U.S. Cl. ..................... 525/388; 525/378; 525/379
(58) Field of Search ................................ 525/388, 378, 525/379

(56) References Cited

U.S. PATENT DOCUMENTS

| | | | |
|---|---|---|---|
| 3,705,922 A | 12/1972 | Callighan et al. | 260/535 R |
| 3,931,024 A | 1/1976 | Hu | 252/51.5 R |
| 4,832,702 A | 5/1989 | Kummer et al. | 44/62 |
| 5,015,760 A | 5/1991 | Sajtos | 560/186 |
| 5,103,061 A | 4/1992 | Blackborow et al. | 564/472 |
| 5,274,182 A | 12/1993 | Weider et al. | 560/347 |
| 5,424,356 A | 6/1995 | Parker et al. | 524/555 |
| 5,453,547 A * | 9/1995 | Zutter | 568/469 |

FOREIGN PATENT DOCUMENTS

| | | |
|---|---|---|
| EP | 0 099 981 | 2/1984 |
| EP | 0 123 424 | 10/1984 |
| EP | 0 389 722 | 10/1990 |
| EP | 0 781 793 | 7/1997 |
| EP | 0 882 782 | 12/1998 |
| FR | 975.461 | 3/1951 |
| GB | 1083610 | 9/1967 |
| GB | 1172818 | 12/1969 |
| WO | WO 95/17440 | 6/1995 |

* cited by examiner

Primary Examiner—Fred Zitomer
(74) Attorney, Agent, or Firm—Richard P. Fennelly

(57) ABSTRACT

The invention relates to a process to make aminated polyolefins involving the steps of:

ozonolysis of one or more low-molecular weight polyolefins with at least one end group that is unsaturated, in the presence of an alkanol-hydrocarbon mixture, to form polyolefin-alkoxyhydroperoxides, catalytic reduction of the polyolefin-alkoxyhydroperoxides with hydrogen and a suitable catalyst, to form a mixture of hemiacetals and hemiketals, in the presence of a solvent, removal of the catalyst and optional washing of the mixture resulting from step 2, to remove undesired side products, reductive amination of the hemiacetal hemiketal mixture to form the aminated polyolefin end product, preferably at a temperature of 50–200° C., optionally in the presence of a solvent, and removal of the catalyst and optional removal of the solvent. The aminated products obtained are pre-eminently suited for use as an adjuvant in oils and fuels.

8 Claims, No Drawings

PROCESS TO MAKE AMINATED POLYOLEFINS

This application claims priority from European Patent Application No. 00200252.5, filed Jan. 25, 2000.

The present invention relates to a new process to make aminated polyolefins, particularly aminated polyisobutylenes.

Aminated polyisobutylenes have long been used as an additive in lubricating oils and/or fuels, such as gasoline, especially unleaded gasoline. Early on, these products were made by halogenation and subsequent amination of low-molecular weight polyolefins, as described in for instance GB 1,083,610. Because of the desire not to use a halogenation process, other routes to the aminated polyolefins were sought.

GB 1,172,818 discloses a process wherein a long-chain ketone or aldehyde, which may be formed through ozonolysis of an olefin polymer and subsequent decomposition of the products formed, is reacted with one or more specific diamines. Specific types of aminated polyolefins are obtained. This process was found to be cumbersome, especially because first the ketone or aldehyde has to be formed and purified. Although conventional techniques are used, this decomposition step is elaborate and costly.

EP-A-0 123 424 discloses employing a specific oxidation process which involves the use of at least one hydroperoxide and at least one peroxide, to oxidize an olefinic polymer which is separated from the reaction mixture. Preferably, the so-oxidized polymers are further reacted with ammonia or organic amines other than tertiary compounds. The use of ammonia in this process resulted in aminated polyolefins with favourable properties. However, the process to make them is not very economical, since it requires the use and handling of at least two types of peroxides.

U.S. Pat. No. 4,832,702 deals with the difficulties observed in the various oxidative processes by introducing a hydroformylation step. The products differ from the previous aminated polyolefins in that an additional carbon atom is introduced into the molecule. This process has gained commercial significance even though it is not very economical. The process is particularly uneconomical if aminated polyisobutylenes are made, because polyisobutylene with an isobutylene end group, which is present for about 25% in commercial polyisobutylenes, shows poor conversion in the hydroformylation process. U.S. Pat. No. 5,103,061 discloses a process wherein a low-molecular weight polyolefin is first treated with ozone and the resulting product is reacted directly with a primary hydrocarbyl amine. After further treatment aminated polyolefins are obtained. This process is considered to be hazardous even if the ratio of ozone to olefin is selected properly, especially because the primary products of the ozonation are described to be refluxed without taking any precautions. U.S. Pat. No. 5,274,182 introduces another alternative process in which a high-molecular weight isobutylene-diene copolymer is degraded by means of ozone, the degradation products having two lateral functional groups. These groups can be modified, inter alia, with the aid of ammonia in order to obtain specific aminated polyisobutylenes. However, the handling of the very high-molecular weight product can be difficult and use is to be made of the specific copolymer. It is noted that the degradation products of the ozonolysis are stabilized to prevent further oxidation because of the peroxides that are present. The introduction of such additives is time consuming, expensive and for those reasons regarded to be undesired.

Since the aminated polyolefins are of increasing interest for use in modern-day oils and fuels, a new process was sought that: i) does not suffer from the hazards of the above-mentioned processes, ii) can be derived from off-the-shelf low-molecular weight polyolefins, iii) gives good yield, also if polyisobutylenes with an isobutylene end group are used as a raw material, iv) can be practised without the necessity of purifying intermediates and/or adding additional chemicals, and v) preferably can be run in a continuous fashion.

Surprisingly, we have found that a new process fulfills most, if not all, of these requirements. This new process, the first embodiment of the present invention, includes an ozonolysis, a reduction, and a reductive amination step. More particularly, the process involves the steps of:

1. ozonolysis of one or more low-molecular weight polyolefins with at least one end group that is unsaturated, in the presence of an alkanol-hydrocarbon solvent mixture, to form a solution/dispersion of polyolefin-alkoxyhydroperoxides,
2. subsequent catalytic reduction of the crude solution/dispersion of polyolefin-alkoxyhydroperoxides with hydrogen and a suitable catalyst, to form a solution/dispersion of hemi-acetals and or -ketals,
3. removal of the catalyst and optional washing of the mixture resulting from step 2, to remove undesired side products,
4. reductive amination of the hemiacetals and or -ketals to form the aminated polyolefin end product, preferably at a temperature of 50–200° C., optionally in the presence of a solvent, and
5. removal of the catalyst and optional removal of the solvent.

The ozonolysis is conducted in a conventional way, using conventional equipment. Suitably, ozone gas and an optional diluent gas, such as oxygen or air, are bubbled through a solution/dispersion of the unsaturated low-molecular weight polyolefin in the hydrocarbon/alkanol solvent mixture. Part of the acetone and formaldehyde formed will remain in the mixture, while the rest may be carried off, together with some solvent, with the optional diluent gas. Traces of formic acid may form. Preferably, conditions are chosen such that throughout the reaction the mixture is in the form of a solution. In that case, the ozonolysis time can be kept short. Furthermore, it is preferred to conduct the ozonolysis in a continuous fashion. In an non-optimized experimental set-up where the ozonolysis was conducted in a continuous fashion at 0–20° C., average residence times of 30 seconds were shown to be sufficient to get a conversion of the unsaturated groups of >95%. Preferably, the ozonolysis is conducted in such a fashion that essentially no formaldehyde is formed by either selecting the appropriate low-molecular weight polyolefin or the proper reaction conditions, e.g. by lowering the ozone concentration, which measures are either known to the skilled person or found by routine experimentation.

The low-molecular weight polyolefin with at least one unsaturated end group that is used as raw material is preferably selected from the group consisting of polypropene, polyisobutene, poly-1-butene, ethene-propene copolymer, ethene-isobutene copolymer, ethene-1-butene copolymer, propene-isobutene copolymer, propene-1-butene copolymer, and terpolymers of ethene, propene and/or butene with one or more other ethylenically unsaturated monomers, such as styrene, α-methylstyrene, vinyl naphthalene, butadiene, and isoprene, with at least one unsaturated ethenyl (—CH=CH$_2$), 1-propenyl (—CH=CH—CH$_3$), 2-propenyl (—CH$_2$—CH=CH$_2$), 1-isobutenyl (—CH=C(CH$_3$)$_2$), 2-isobutenyl (—CH$_2$—C(CH$_3$)=CH$_2$), 2-butenyl (—CH$_2$—CH=CH—CH$_2$), or 3-butenyl (—CH$_2$—CH$_2$—CH=CH$_2$) end group. Preferably, it is a polyisobutene, poly-1-butene, or a co- or ter-polymer with 30% or more, preferably 50% or more, monomeric units derived from 1-butene or isobutene, with one of the indicated end groups. More preferably, it is a polyisobutene with 1-isobutenyl (—CH=C(CH$_3$)$_2$) and/or 2-isobutenyl (—CH$_2$—C(CH$_3$)=CH$_2$) end groups. Most preferred are commercial mixtures of said polyisobutenes with said 1-isobutenyl and/or 2-isobutenyl end groups. For ease of production and for increased purity of the product it is preferred to use a low-molecular weight unsaturated polyolefin with just one unsaturated end group. The number averaged molecular weight (Mn) of these low-molecular weight unsaturated polyolefin materials preferably is from 300 to 5000 Dalton. More preferably, they have a Mn of 400–3000, most preferably from 500–2000 Dalton. An example of a preferred low-molecular weight unsaturated polyolefin is Glissopal® 1000 of BASF.

The alcohol of the solvent mixture may be any linear or branched C$_{1-12}$ alkanol. Preferably, it is a linear or branched C$_{1-4}$ alcohol, such as ethanol, propanol-1, isopropanol, any butanol isomer, or mixture thereof. However, also C$_{1-20}$ diols, triols and/or ether alcohols can be used, such as ethylene glycol, propylene glycol, diethylene glycol, glycerol, and ethoxylated and/or propoxylated glycerol. Preferably, a C$_{1-4}$ alcohol is used, ethanol being most preferred. The hydrocarbon of the solvent mixture may be any linear or branched C$_{4-20}$ hydrocarbon. Preferably, the hydrocarbon is aliphatic. More preferably, it is a C$_{5-10}$ alkane, hexane and heptane being most preferred.

The alcohol and the hydrocarbon can be used in any ratio, provided at least 5% by weight of the low-molecular weight unsaturated polyolefin dissolves therein at 20° C. The preferred ratio will depend on the low-molecular weight unsaturated polyolefin, alkanol, and hydrocarbon used. For the preferred Glissopal®1000, a mixture of 17.5 percent by weight (% w/w) ethanol and 82.5% w/w of hexane proved to be suitable. The amount of low-molecular weight unsaturated polyolefin that can be used per quantity of said solvent depends on its solubility, the viscosity of the solution/dispersion tolerated by the equipment, and the solubility of the ozonated product. However, because the alkanol participates in the reaction of the ozone with the unsaturated end groups to form alkoxyhydroperoxides, it is preferred to use so much solvent and low-molecular weight unsaturated polyolefin that the molar ratio of —OH groups of the alcohol to unsaturated groups of the polyolefin ranges from 0.5 to 50, preferably from 1 to 40, and most preferably from 2 to 20.

The crude hydrocarbon/alcohol solutions/dispersions of alkoxyhydroperoxides are reacted further in step 2 with hydrogen to form low-molecular weight polyolefins with hemiacetal or hemiketal end groups. It is estimated that the alkoxyhydroperoxide concentration may vary from 1–30% w/w. The balance of the solution typically consists of the hydrocarbon, residual low-molecular weight unsaturated polymer, and side products of the first step. The preferred amount depends, inter alia, on the solubility of the alkoxyhydroperoxide raw material and the hemiacetal product. Suitably, a solution/dispersion with 5–20% w/w of alkoxyhydroperoxides and 10–20% w/w of alkanol in the hydrocarbon is used.

The catalyst to be used in this process step can be selected from common precious metal reduction catalysts. Those may be applied coated on a porous support or as such in powdered. Porous supports in this embodiment may be activated charcoal, alumina, silica gel or diatomaceous earth. Preferably a conventional platinum or palladium catalyst, without a porous support, is used and conventional process conditions applied. The hydrogen pressure applied can be from 0.1 to 5 bara. Typically, a conversion of close to 100% and a selectivity of close to 100% are attainable using a hydrogen pressure of 1.5 bar absolute (bar or bara) and an (average) contact time of 30 minutes at 30° C. This process step is preferably conducted in a continuous fashion as well and in combination with the ozonation step described above.

As it has been already described in EP 0 099 981 A1 and U.S. Pat. No. 3,705,922, alkoxyhydroperoxides are reduced by the action of hydrogen and the aid of a precious metal catalyst to form hemiacetals and/or hemiketals. As NMR spectroscopic measurements have shown this holds true for the current PIB-alkoxyhydroperoxides as well.

In step 3 the catalyst is filtered out of the product mixture resulting from step 2. Preferably, the catalyst is recycled to step 2. Optionally, the product is then washed in a conventional way, in one or more washing steps, to remove the side products formed in any of the previous steps, such as formaldehyde, formic acid, and acetone. Preferably, the wash is conducted with water or an alkanol as used in step 1 or 2. If washed, also the alkanol of step 2 may be removed from the mixture. Most preferably, water is used in at least the last washing step. Preferably, the washing is conducted in such a fashion that all acidic side products are removed, since such acidic material can interfere in the following process step. Consequently, it may be preferred to use an alkaline reagent, such as sodium hydroxide or sodium bicarbonate, in one or more of the washing fluids to ensure the removal of acid. Typically, the washing step is conducted at ambient temperature for a period of 5 to 60 minutes.

In step 4 the hemiacetal hemiketal mixture is aminated with ammonia, or higher primary or secondary amines, and hydrogen. Preferably, ammonia and hydrogen are used. If so desired, use is made of higher primary or secondary amines, which can be selected from any hydrocarbyl mono-, di-, or polyamine. The higher primary amines may contain further nitrogen atoms, for example in the form of a (further) secondary amine moiety. Suitable hydrocarbyl amines include: alkylamine, such as methylamine, ethylamine, propylamine, isopropylamine, butylamine, isobutylamine, isomers of hexylamine, isomers of coco amine, and isomers of (hydrogenated) tallow amine; alkylene diamine, such as ethylene diamine, propylene diamine, isopropylene diamine, butylene diamine, isobutylene diamine, and isomers of hexamethylene diamine; dialkylene triamine, such as diethylene triamine, dipropylene triamine, diisopropyl triamine, isomers of dibutyl triamine, and isomers of dihexyl triamine; trialkylene tetramine, such as triethylene tetramine and isomers of tripropylene tetramine; tetraalkylene pentamine, such as tetraethylene pentamine; pentalkylene hexamine, such as pentaethylene hexamine; o-, m-, or p-phenylene diamine; alkyl substituted o-, m-, or p-phenylene diamine; dialkyl aminoalkylamine, such as dimethyl aminomethylamine, dimethyl aminoethylamine, dimethyl aminomethylamine, dimethyl aminopropylamine, dimethyl aminobutylamine, dimethyl aminohexylamine, diethyl aminomethylamine, diethyl aminoethylamine, diethyl aminopropylamine, diethyl aminobutylamine, diethyl aminopentylamine, diethyl aminohexylamine, dipropyl aminomethylamine, dipropyl aminoethylamine, dipropyl aminopropylamine, dipropyl aminobutylamine, dipropyl aminopentylamine, and dipropyl aminohexylamine; aniline; alkylene aniline, including products like methylene dianiline and dimethylene trianiline; polyalkylene aniline; and secondary amines of the general formula R$^1$NHR$^2$ where R$^1$ and R$^2$ may be independently selected from cyclic, straight, branched, and/or unbranched alkyl, heteroalkyl, aromatic or heteroaromatic groups.

In this step a conventional catalyst and conventional conditions are employed. Good results were obtained using a preferred catalyst, viz. palladium on an activated carbon support. Hydrogen pressures of 5 to 50 bara, preferably 10–30 bara, were suitable. If ammonia is used, the ammonia pressure can be selected from 10 to 50 bara, preferably 20–40 bara. An ammonia pressure of about 25 bara was used with success. The process temperature can range from 50 to 200° C. At higher temperatures faster reaction rates were observed. However, a higher temperature is more demanding on the equipment that is used. Therefore, it is preferred to use a reaction temperature of 75–150° C., more preferably 100–150° C. A temperature of about 140° C. is most preferred. Reaction times may be as long as 20 hours. Preferably, the reductive amination is conducted in a continuous fashion.

Reductive amination can be employed using a solution/dispersion of the hemiacetal. To facilitate the reaction, it is preferred to work in a solution. Preferably, the solvent comprises an hydrocarbon alkanol mixture. More preferably, an hydrocarbon alkanol mixture as presented for step 1 is used. Most preferably, the hydrocarbon alkanol mixture is the same as the hydrocarbon alkanol mixture used in step 2. The alkanol of the previous steps typically is still present. If so desired, further alkanol may be added to the mixture. In that case it is preferred to use the alkanol of step 1.

In the last step, the catalyst used in the reductive amination step is removed, typically by filtration. Preferably, the catalyst is recycled to step 4. The resulting product, which may be in the form of a solution/dispersion, can be used as is, or it may be subjected to a further step to remove part or all of the solvent. Suitably a distillation step is used to remove most of the solvent. Preferably, the distillation is performed under reduced pressure.

Preferably, the process is conducted in a continuous fashion, using a cascade of three or more reaction vessels, optionally together with one or more holding and/or washing vessels, in which the ozonolysis, the reduction, and the reductive amination are performed in series.

It is noted that the aminated olefinic products obtained are partly of the same type as the products obtained by the process of EP-A-0 123 424.

A second embodiment of the invention is the use of the aminated olefinic products obtained by the process of the first embodiment as a fuel and lubricating oil additive. Preferably, the aminated olefinic products are used as an additive in fuels for combustion engines. In such a use they were found to reduce or prevent the formation of deposits on the valves and cylinder walls of the engine in which the fuel is used. Depending on the conditions, the detergent properties of the aminated olefinic products can be such that even existing deposits are removed. Any fuel or lubricating oil can be used with the products of the invention. Preferred fuels include oil fractions ranging from kerosene to diesel. If used in lubricating oils, the oil may be any suitable lubricating oil, including those based on naphthalene, paraffin, other hydrocarbons, synthetic oils, or derived from coal products. Synthetic oils are known to include alkylene polymers, alkylene oxide polymers, dicarboxylic acid esters, silicon products, and the like.

In fuels, the aminated olefinic products are typically used in an amount of 10 to 2,000 mg/kg. Preferably, they are used in an amount of 50–400 mg/kg, more preferably in an amount of 75–200 mg/kg. In lubricating oils, they are typically used in an amount of 0.05–25% by weight.

Experimental

The following chemicals were used:

Glissopal® 1000 ex BASF, being about 75% w/w of

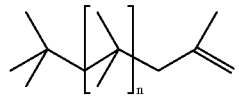

and about 25% w/w of

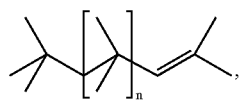

with n being such that the number averaged weight of the product is 1,000.

Hydrogen 99.9% ex BOC Cylinder Gas N.V., Herenthout

Ammonia 99.9% ex BOC Cylinder Gas N.V., Herenthout

NaHCO$_3$ 99.5% ex Merck KGaA, Darmstadt

Ethanol 99.9% containing 1% Petrolether ex Fa. Martin u. Werner-Mundo

Hexane, pure Merck 104368

Water=demineralized

Platinum (Adams) catalyst for step 2 PtO$_2$ ex Aldrich 20,603-2

Palladium on activated carbon reductive amination catalyst type 39 ex Johnson

Matthey 5% Pd, water content 59.1%

Ozone was produced from oxygen 99.5% ex BOC Cylinder Gas N.V., Herenthout, on-site using an ozone generator ex Fischer with an ozone capacity of 50 g/m$^3$ oxygen

EXAMPLE 1

A standard glass coil cooler with a length of 30 cm is used as the ozonization reactor. The temperature of the coil was controlled at 0° C. by circulating cooling fluid through the cooler around the coil. The coil cooler was mounted on a three-necked flask of 100 ml, which served as a holding vessel. Ozone containing oxygen gas from the generator was pumped through the flask up through the coil at a rate of 1.17 l/min. The ozone thus pumped through the coil was 1.25 mmol/min. A Glissopal® 1000 solution was fed at the top of the coil at a rate of about 3.5 g/min. The solution contained 60% w/w of hexane, 27% w/w of Glissopal® 1000, and 13% w/w of ethanol. The countercurrent thus attained resulted in a conversion of >95% of the unsaturated groups of the Glissopal®. From the three-necked flask, the alkoxyhydroperoxide-containing solution was pumped into a stirred, cylindrical, thermostatted, glass vessel at a rate of about 3.5 g/min. Hydrogen was introduced into the vessel at a rate of about 0.6 mmol/min to maintain a hydrogen pressure of 1.5 bara. At the start of the process, the vessel had been charged with 2 g of platinum (Adams) catalyst and 100 ml of hexane. During the reaction, the vessel was stirred vigorously. Product was withdrawn from the reactor at a rate of about 3.5 g/min. Without cooling, the temperature was 35° C. after reaching a steady state.

In this example, washing was conducted batchwise, using a separating funnel, by extracting 500 ml of the product mixture with: i) 200 ml of water, ii) 200 ml of water saturated with NaHCO$_3$, and iii) water. The resulting product was dried over anhydrous sodium sulfate. The dried product was diluted with 40 ml of ethanol.

The reductive amination was conducted in a 1 l steel autoclave ex Büchi, with a hollow shaft gas turbine stirrer (stirrer speed 1000–1200 min$^{-1}$) and a bottom outlet provided with a filter. The autoclave was charged with 250 ml ethanol, 20.0 g of a 5% palladium catalyst on activated carbon, and subsequently purged first with nitrogen and secondly with hydrogen. The catalyst was activated by heating the contents of the autoclave to 125° C. while maintaining a hydrogen pressure of 40 bara. The activated catalyst was washed twice with 200 ml ethanol and subsequently suspended in 200 ml hexane.

For the reductive amination, the temperature was maintained at 145° C. First 1.0 mole of anhydrous ammonia was added, then all of the washed and dried hemiacetal solution. Thereafter hydrogen was added in an amount such that the overall pressure was 40 bara. The reaction was allowed to run for 20 hours. Filtered product solution was obtained through the bottom outlet.

Solvent vaporation at reduced pressure resulted in a colourless viscous oil. Analysis with conventional wet analytical, GPC, NMR, and MALDI-TOF techniques confirmed the structure to consist of the aminated low-molecular weight polyisobutene, the remainder being a mixture of hexane (4% w/w), unreacted Glissopal® (5% w/w), and low-molecular weight polyisobutenes with oxidic functionality, such as alcohol, acid, and hemiacetal. The overall yield of aminated product in this unoptimized example was 68% on Glissopal.

EXAMPLES 2–4

The previous example was repeated, but the temperature during the reductive amination was controlled at 80° C., 120° C., and 145° C., respectively. The yield of aminated product in these examples was 45, 56, and 68% w/w on Glissopal, respectively.

What is claimed is:

1. Process to make aminated polyolefins involving the steps of:

ozonolysis of one or more low-molecular weight polyolefins with at least one end group that is unsaturated, in the presence of an alkanol-hydrocarbon mixture, to form polyolefin-alkoxyhydroperoxides, catalytic reduction of the polyolefin-alkoxyhydroperoxides with hydrogen and a suitable catalyst, to form a mixture of hemiacetals and hemiketals, in the presence of a solvent, removal of the catalyst and optional washing of the mixture resulting from step 2, to remove undesired side products, reductive amination of the hemiacetal hemiketal mixture in order to form the aminated polyolefin end product, optionally in the presence of a solvent, and removal of the catalyst and optional removal of the solvent.

2. Process of claim 1 wherein a low-molecular weight polyolefin with just one unsaturated end group is used.

3. Process according to claim 1 wherein ammonia is used in the reductive amination step.

4. Process according to claim 1 wherein a higher primary or secondary amine is used in the reductive amination step.

5. Process according to claims 1–4 wherein the low-molecular weight polyolefin comprises a low-molecular weight polyisobutylene.

6. Process according to claim 5 wherein the number averaged molecular weight of the polyisobutylene is from 500–1250 Dalton.

7. Process according to claims 1–4 wherein one or more of the process steps are conducted in a continuous fashion.

8. Process according to claim 6 wherein each step is conducted in a continuous fashion, using cascaded reactors, optionally supplemented with holding and/or washing vessels.

* * * * *